March 25, 1941.     T. J. SNAVELY     2,236,304
OPHTHALMIC MOUNTING
Filed Sept. 28, 1938
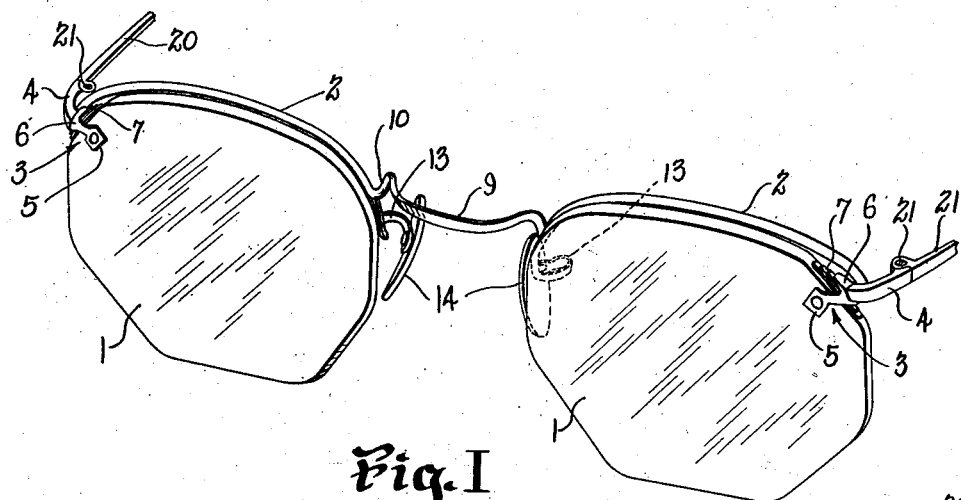
Fig. I
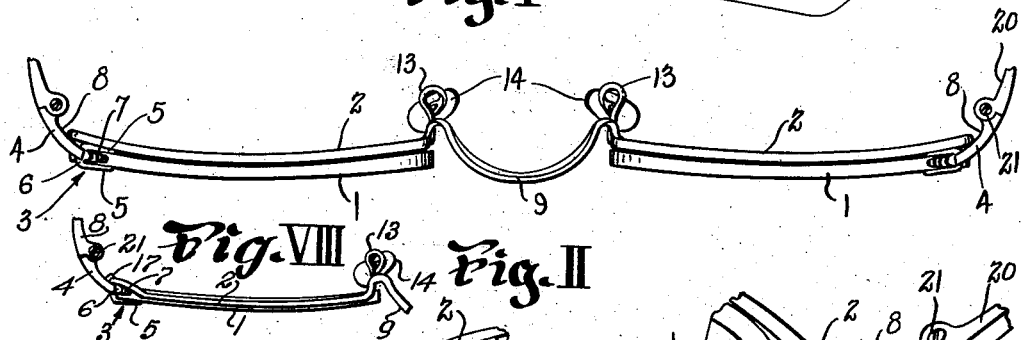
Fig. VIII   Fig. II
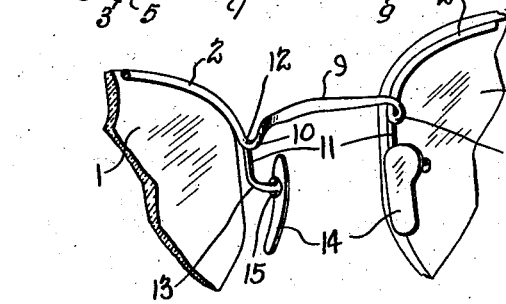
Fig. III
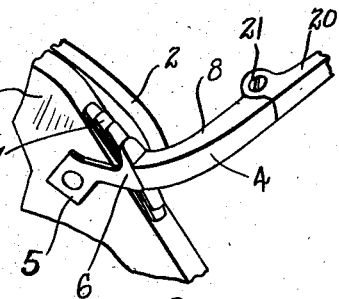
Fig. IV
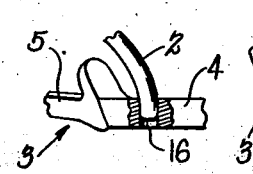
Fig. V
Fig. VI
Fig. VII
INVENTOR.
THOMAS J. SNAVELY
BY Harry H. Still
ATTORNEY.

Patented Mar. 25, 1941

2,236,304

UNITED STATES PATENT OFFICE 2,236,304

OPHTHALMIC MOUNTING

Thomas J. Snavely, Peabody, Kans., assignor to American Optical Company, Southbridge, Mass., a voluntary association of Massachusetts Application September 28, 1938, Serial No. 232,166

5 Claims. (Cl. 88—47)

This invention relates to improvements in ophthalmic mountings and to means of making the same.

One of the principal objects of the invention is to provide a construction of ophthalmic mounting whereby the lenses will be supported so as to be relieved from strain which might be introduced through distortion of the supporting parts of the mounting and in which the major portion of the supporting parts are located above the line of straight ahead vision through the lenses when the mounting is in position of use on the face of the wearer.

Another object of the invention is to provide a semi-rimless type ophthalmic mounting wherein a relatively rigid supporting structure is provided between the temple supports of the mounting and the lenses are independently supported so as to be relieved from strain which might be introduced through distortion of said supports.

Another object is to provide an ophthalmic mounting of the above character with bar-like supports shaped substantially to follow the upper contour edges of the lenses for connecting the temple supporting portions of the mounting with the bridge member in combination with lens connecting members adjacent said temple supports and having means associated therewith for yieldingly maintaining said lenses in desired aligned relation with the bar-like supports.

Another object of the invention is to provide bar-like supports, in a mounting of the above character, shaped substantially to follow the upper contour shape of the lenses and connected to the temple supporting portions of the mounting adjacent the ends thereof and in the rear of said temple support connection with the major portion of said bar-like members lying in a plane in the rear of the inner surfaces of the lenses and relatively invisible and inconspicuous when the mounting is viewed from the front.

Another object of the invention is to provide a unitary support for a mounting of the above character having a central portion shaped to provide the central arch portion of the bridge of the mounting and having its portions on the opposite sides of said central arch portion shaped substantially to the upper contour shape of the lenses and terminating in an attachment to the temple supporting portions of the mounting with the said temple supporting portions having lens strap connections yieldingly associated with the lenses and nose guard supporting arms adjacent the ends of the central arch portion.

Another object is to provide a mounting support suspended or carried by the temple connections and to yieldingly secure said temple connections to the lenses to absorb strain and prevent breakage of the lenses.

Another object is to provide means of making, assembling and fitting an ophthalmic mounting having the bridge and nose bearing portions suspended by bar-like members following the contour of the upper edges of the lenses and carried by the temple connections, said temple connections yieldingly secured to the lenses at their outer edges, providing lenses shaped to fit the bar-like members, bending the bar-like members to fit the lenses, forming adjustable means by bending in the bridge portion and guard supports, bending these portions to the facial requirements to adapt the assembled mounting to the facial requirements of the wearer.

Another object is to provide the temple connections with attachments adaptable to be secured to the lenses adjacent their outer upper edges to position the temples above the center of straight ahead vision when the mounting is in place on the face to provide clear side vision.

Another object is the provision of a two point suspension for the unit comprising the bridge, guard, and bar-like members, said point of support being adjacent the outer edges of the lenses.

Another object is to provide a mounting with means which, by bending, will provide adjustment for the temple, bridge and guard member to meet various facial requirements.

Another object is to provide a light weight, inconspicuous mounting, facile in adjustment, economical in construction and with a a minimum of breakage liability at the lens connections.

Another object is to provide a lens supporting structure of the above character having portions which may be adjusted to fit the facial requirements of different individuals and portions which may be adjusted to fit lenses of different sizes and contour shapes.

Other objects and advantages of the invention should become apparent from the following description taken in connection with the accompanying drawing and it will be apparent that many changes may be made in the details of construction and arrangement of parts without departing from the spirit of the invention as expressed in the accompanying claims. I, therefore, do not wish to be limited to the exact details of construction and arrangement of parts as the preferred forms only have been given by way of illustration.

Referring to the drawing:

Fig. I is a perspective view of the mounting embodying the invention;

Fig. II is a plan view of the mounting shown in Fig. I;

Fig. III is a rear perspective view of the bridge, nose pad and bar-like supporting structure of the mounting;

Fig. IV is an enlarged perspective view of the temple supporting structure and associated supporting parts of the mounting;

Fig. V is an enlarged rear perspective view of the temple support and associated parts of the mounting showing the connection of the bar-like support, which is shaped substantially to the upper contour shape of the lens, to said temple support;

Fig. VI is a fragmentary side elevation of a modified form of bar-like support connection to the temple support;

Fig VII is a fragmentary plan view of the temple support showing a further modification of bar-like connection to said temple support, and Fig. VIII is a fragmentary plan view of a modified construction of ophthalmic mounting embodying the invention.

The usual design of prior art ophthalmic mountings embodied two major constructions; one commercially known as a frame type mounting and the other as a rimless type mounting.

Rimless type mountings were exceptionally desirable from the aesthetical viewpoint as they were relatively inconspicuous on the face. They were also desirable from the optical viewpoint because they provided unobstructed vision throughout the major portion of the contour edges of the lenses. Such mountings, however, were relatively delicate and quite susceptible to becoming broken during use. This was due mostly to the fact that the supports for such mountings were relatively small and were also connected to the lenses so that the bulk of the strain of use was directed to said lenses at the point of connection. Such strain was, in most part, introduced when flexing the temples outwardly during the act of placing the mounting on or removing it from the face.

The above difficulties were greatly eliminated in frame type mountings, as the strain created by flexing the temples was distributed throughout the rim portions of the mounting surrounding the contour edges of the lenses. Such rim constructions were quite conspicuous when in position on the face and also restricted vision throughout the contour edges of the lenses.

It, therefore, is one of the primary objects of this invention to overcome the above difficulties by providing novel means of supporting the lenses so that all of the desirable features of both the frame and rimless type constructions will be retained and the undesirable features thereof eliminated. This result is accomplished through the provision of supporting means so constructed as to relatively rigidly connect the temple supports and bridge means of the mounting independently of the lenses with the major portion of said supporting portions of the mounting positioned above the line of straight ahead vision through the lenses when the mounting is in position of use on the face to provide clear side vision and through the provision of lens connecting means which yieldingly supports the lenses independently of the main supporting elements of the mounting.

Referring more particularly to the drawing wherein like characters of reference designate like parts throughout the several views the device embodying the invention comprises broadly a pair of lenses 1 having bar-like supports 2 extending about the upper peripheral edges thereof and preferably behind them. The lenses 1 are connected to suitable lens straps 3 having temple supporting portions 4 secured thereto.

The lens straps 3 are of the conventional prior art type having spaced lens face engaging members 5 and an edge portion 6 overlying the edge of the lens and provided with resilient spring means 7, such as a plurality of leaf springs or the like for resiliently limiting the movement of the lens strap on the lens and for easing off strain at said connection to said strap. The spaced lens face engaging portions 5 may be connected to the lenses by any means known in the art, such as screw, pin, solder or adhesive connection, it being desirable, however, that said connection be such as to provide a pivotal connection of the lens strap to the lens in order to obtain the yielding action of the springs 7. The bar-like supports 2 are connected adjacent the outer ends thereof to the inner rear surfaces 8 of the temple supports 4, as by solder or welding, or by suitable mechanical means. The said bar-like supports 2 are associated intermediate the ends thereof with the central arch portion 9 of the bridge member of the mounting. This central arch portion 9 is so constructed as to have rearwardly extending loop portions 10 adjacent the ends thereof which join the said central arch portion to the main supporting portions 2 of the bar-like members. Suitable nose guard supporting arms 11 are associated adjacent their upper ends 12 with the nasal sides of the bar-like members 2, and extend downwardly and terminate in rearwardly extending loop portions 13 to which suitable nose bearing pads 14 are pivotally carried as illustrated at 15.

It is to be understood that the central arch portion of the bridge member may be formed separately of the bar-like supports 2 and secured thereto by soldering or welding, as desired. It is also to be understood that the nose pad supporting arms 11 may be formed integral with the bar-like portions 2 with the forward ends of said loop portions 10 of the bridge member secured to said bar-like supports by soldering or welding as desired.

Although the bar-like supports 2 are illustrated as being positioned in the rear of the plane of the inner surfaces of the lenses and in the rear of the upper contour edges of the lenses, it is to be understood that the said bar-like portions may be shaped to the upper contour edges of the lenses and positioned in the plane of said lenses if desired. In this instance the outer ends of the bar-like members might be secured to the upper, outer or under surfaces of the temple supports 4 or might extend within a suitable opening 16 formed in said temple supports 4 and be secured therein as by soldering, welding or the like, as illustrated in Fig. VI. This connection may be also in the form of a stud box connection comprising a housing 17 secured to the temple support 4, as by soldering, welding or the like, as illustrated in Fig. VII, and into which the end 18 of the bar-like member 2 might be extended and be secured therein as by a screw 19 or other mechanical means or by soldering or welding.

It is particularly pointed out that the temple supports 4 are relatively long so as to provide ample adjusting portions in the rear of the point of connection of the bar-like supports 2 thereto.

It is to be understood, however, that the said temple supports do not necessarily have to be of the long and adjustable type to be within the scope of applicant's invention as the said temple supports may be of such a length only as to permit the securing of the bar-like supports thereto.

In the construction of the mounting the lenses 1 are finished to the desired size and contour shape to accommodate the bar-like members. The bridge member 9 and bar-like supports 2 are so shaped as to meet the general requirements of individuals for whom such mountings are being formed, that is, as to size and shape. The bar-like supports 2 are secured adjacent their outer ends to the temple supports 4, which are carried by the lens straps 3. The lenses 1 are shaped, fitted and connected with the lens straps 3 in the usual manner and the bar-like members 2 and bridge member 9 together with the nose pad supporting arms are adjusted by bending so that the bar-like members will be shaped substantially to the upper contour shape of the lenses and so as to support the said lenses in aligned spaced relation with each other, as determined by the distance between the centers of the pupils of the eyes of the individual for whom the mounting is being formed. The bridge member 9 and nose pad supporting arms 11 are then adjusted by bending to properly position the supporting parts of the mounting in desired aligned relation with each other and to fit the nose and other facial characteristics of the wearer.

When the lenses are in proper fitted relation with the lens straps the resilient means 7 will ease off the strain at the connections of said straps to the lenses and the said lenses will be resiliently supported in proper aligned relation with the bar-like supports 2 in such a manner as to be free from strain which might be introduced by flexing or other distortion of said bar-like supports or associated supporting parts of the mounting. It is particularly pointed out that the lens strap connections to the lenses are positioned only on the temporal sides of the lenses so that the lenses are free adjacent the nasal sides thereof. When the mounting, such as shown in Fig. I, is completed, the bar-like portions 2 will lie in the rear of the upper edges of the lenses and will be relatively invisible and inconspicuous when the mounting is viewed from the front.

The construction set forth above provides, through the bar-like supports 2 and joining bridge member 9, a relatively rigid, though bendable, strut-like support connecting the temple supporting members 4. This connection is entirely independent of the connection of the lenses 1 to the lens straps 3. It is to be understood that suitable temples 20 are pivotally connected to the temple supports as indicated at 21.

The construction of the bar-like members and central arch portion 9, together with the loops 10 and relatively long nose pad supporting arms 11, is such as to provide ample means for adjustment by bending whereby the distance between the centers of the lenses may be increased or decreased to compensate for the variation in the distances between the pupils of the eyes of different individuals so that a single mounting may be adjusted to meet the requirements of several different individuals. It is also pointed out that the bar-like supports 2, bridge member, temple supports and lens strap connections to the lenses, as shown, are all positioned above the normal line of straight ahead vision through the lenses when the mounting is in position of use on the face of the wearer so that the wearer will have clear unobstructed vision throughout the major portion of the contour of the lenses or at least throughout the most useful field of vision through said lenses, and particularly clear vision under the temples at the sides.

The stud box type of connecting means, such as shown in Fig. VII, is used so as to enable the providing of a plurality of different sizes of semi-frame type supporting structures for use with lenses of different sizes and contour shapes and to meet the facial requirements of different individuals. Such different sizes of semi-frame type supporting structures may be stocked by dispensers and may be readily attached to the lens and temple supports by mechanical means, such as a screw, as shown in Fig. VII, or by soldering, welding or the like. This arrangement greatly facilitates the ease in assembling the lens straps with the lenses as the said straps may be located and secured in desired relation with the lenses prior to the connection of the semi-frame structure to said temple supports. It is to be understood that in all of the above instances suitable adjustments must be made to properly align the parts of the mounting so as to fit said mounting to the face of the wearer. It is to be understood that in said stud box construction the outer ends of the bar-like supports are shaped so as to fit snugly within the stud box and are provided with suitable connection openings through which the screw or other connections may be extended, the stud box being provided with a suitable threaded opening or the like to receive the connection means.

In the instances wherein the temple supports are provided with connection openings, such as illustrated in Fig. VI, the bar-like supports are initially formed to such a length as to permit the said bar-like members to be cut and shaped to the upper contour edge of the lenses of different sizes.

Although the bar-like members are illustrated as being of substantially circular cross-sectional shape it is to be understood that the said members may be formed square, rectangular, triangular or to any other desired cross-sectional shape.

It is also to be understood that any desirable design on the central arch portion or bridge member may be formed.

It is particularly pointed out that in the construction illustrated in the drawing the temple supports and temples have their outer surfaces in flush and blended relation with each other so as to produce a pleasing streamlined effect.

In instances wherein the bar-like members and nose pad supporting arms are formed integral with each other with the said inner or nasal ends of the bar-like members and nose pad supporting arms having depending substantially vertically extending joining portions, the said bridge member may be secured at any desired position throughout the length of said depending portions so that the size of the bridge may be varied as desired. The rearwardly and upwardly extending loop portions adjacent the end of the bridge member provide means for adjustment to bring about slight variations in the height or width or outer position of the central arch or bridge member.

Although applicant has shown and described an arrangement for resiliently supporting the lenses in desired aligned relation with the bar-like members it is to be understood that a solid type lens strap connection with the lens may be used, in which instance, the said lenses will not have a pivotal movement relative to the lens strap.

It is clear that many shapes of lenses may be used by having the top contour edges similar and their under portions different.

It is clear also that various widths of lenses may be used by regulating the length of the bar-like members before they are secured to the temple connections, this provides an important feature in adjustment to facial requirements.

The lenses may be shaped by edging to the bar-like members, and the bar-like members may be shaped by bending to the lenses.

The mounting unit may be integral, or of separate parts secured together to form a unitary structure. For this function they are equivalent.

From the foregoing description it will be seen that simple, efficient and economical means have been provided for forming an ophthalmic mounting embodying all of the features and advantages set forth in the objects of the inventions.

Having described the invention, I claim:

1. A spectacle comprising spaced aligned lenses, central supporting means having a central bridge portion and relatively long and slender arm members supported by said central supporting means and following the contour of the top of the lenses, temple supporting members having lens connection means adjacent one end thereof with a portion shaped to overlie the rear side surface of the lens adjacent the upper outer portions of the lenses and a relatively long adjustable intermediate portion extending outwardly and rearwardly of said surface of the lens and terminating in pivotal temple connections and temples pivoted to said connections, the outer ends of said relatively long and slender arm members being supported by said temple supporting members intermediate the lens and pivotal connections of said members with the supported end of said arm members located in the rear of the surface of the lens connection means overlying the rear surface of the lens and in the rear of the outer face of the intermediate portion when viewed from the side with said supported end extending below the upper surface of said intermediate portion, said lenses having finished optical surfaces of required prescriptive power adapted to be positioned by said supporting member before the eyes in accordance with the required optical prescriptive properties of the lenses.

2. A spectacle comprising spaced aligned lenses, central supporting means having a central bridge portion to fit over the nose and guard means adapted to fit on the sides of the nose, relatively long and slender arm members supported by said central supporting means and following the contour of the top of the lenses, temple supporting members having lens connection means adjacent one end thereof with a portion shaped to overlie the rear side surface of the lens adjacent the upper outer portions of the lenses and a relatively long adjustable intermediate portion extending outwardly and rearwardly of said surface of the lens and terminating in pivotal temple connections and temples pivoted to said connections, the outer ends of said relatively long and slender arm members being supported by said temple supporting members intermediate the lens and pivotal connections of said members with the supported end of said arm members located in the rear of the surface of the lens connection means overlying the rear surface of the lens and in the rear of the outer face of the intermediate portion when viewed from the side, said lenses having finished optical surfaces of required prescriptive power adapted to be positioned by said supporting member before the eyes in accordance with the required optical prescriptive properties of the lenses.

3. A spectacle comprising spaced aligned lenses, central supporting means having a central bridge portion and relatively long and slender arm members supported by said central supporting means and following the contour of the top of the lenses, temple supporting members having lens connection means adjacent one end thereof with a portion shaped to overlie the rear side surface of the lens adjacent the upper outer portions of the lenses and a relatively long adjustable intermediate portion extending outwardly and rearwardly of said surface of the lens and terminating in pivotal temple connections and temples pivoted to said connections, the outer ends of said relatively long and slender arm members being supported by said temple supporting members intermediate the lens and pivotal connections of said members with the supported end of said arm members located in the rear of the surface of the lens connection means overlying the rear surface of the lens and in the rear of the outer face of the intermediate portion when viewed from the side, and with the end surface of the supported ends of the arm members lying substantially flush with the under surface of the outwardly and rearwardly extending adjustable portion of the temple supporting members, said lenses having finished optical surfaces of required prescriptive power adapted to be positioned by said supporting member before the eyes in accordance with the required optical prescriptive properties of the lenses.

4. A lens supporting structure for use with spaced aligned lenses, said structure comprising central supporting means having a central bridge portion to fit over the nose and guard means adapted to fit on the sides of the nose, relatively long and slender arm members supported by said central supporting means and following the contour of the top of the lenses, temple supporting members having lens connection means adjacent one end thereof with a portion shaped to overlie the rear side surface of the lens adjacent the upper outer portions of the lenses and an adjustable intermediate portion extending outwardly and rearwardly of said surface of the lens and terminating in pivotal temple connections and temples pivoted to said connections, the outer ends of said relatively long and slender arm members being supported by said temple supporting members intermediate the lens and pivotal connections of said members with the supported end of said arm members located in the rear of the surface of the lens connection means overlying the rear surface of the lens and in the rear of the outer face of the intermediate portion when viewed from the side.

5. A lens supporting structure for use with spaced aligned lenses, said structure comprising central supporting means having a central bridge portion to fit over the nose and guard means adapted to fit on the sides of the nose, relatively long and slender arm members supported by said central supporting means and following along the rear of the top of the lenses, temple supporting members having lens connection means adjacent one end thereof with a portion shaped to overlie the rear side surface of the lens adjacent the upper outer portions of the lenses and an adjustable intermediate portion extending outwardly and rearwardly of said surface of the lens and terminating in pivotal temple connections and temples pivoted to said connections, the outer ends of said relatively long and slender arm members being supported by said temple supporting members and attached to the rear surface of the intermediate portion of said temple supporting members, with the attached end of said arm members located in the rear of said intermediate portions and being concealed from view by said intermediate portions when the mounting is viewed from the side.

THOMAS J. SNAVELY.